United States Patent
Wilk et al.

(10) Patent No.: US 6,195,135 B1
(45) Date of Patent: Feb. 27, 2001

(54) THIN VIDEO DISPLAY WITH SUPERLUMINESCENT OR LASER DIODES

(76) Inventors: Peter J. Wilk, 185 West End Ave., New York, NY (US) 10023; Robert C. Stirbl, 247 Wadsworth Ave., New York, NY (US) 10033

( * ) Notice: Subject to any disclaimer, the term of this patent is extended or adjusted under 35 U.S.C. 154(b) by 0 days.

(21) Appl. No.: 08/969,731

(22) Filed: Nov. 13, 1997

(51) Int. Cl.[7] .................................................. H04N 5/70
(52) U.S. Cl. ........................ 348/801; 348/818; 345/76
(58) Field of Search ..................... 348/678, 679, 348/686, 687, 818, 825, 826, 832, 833, 834, 835, 758, 801; 345/75, 175, 76; 359/152; 437/129; 385/31, 15, 116, 147; 315/169.1; 313/310; 445/24; 257/88, 466; H04N 5/70

(56) References Cited

U.S. PATENT DOCUMENTS

| | | | |
|---|---|---|---|
| 3,609,235 | * 9/1971 | Sawyer | 348/835 |
| 4,445,132 | * 4/1984 | Ichikawa et al. | 348/801 |
| 4,577,932 | * 3/1986 | Gelbart | 359/305 |
| 4,761,056 | * 8/1988 | Evans et al. | 359/631 |
| 4,772,886 | * 9/1988 | Hasegawa | 348/801 |
| 5,127,078 | * 6/1992 | Terry et al. | 385/116 |
| 5,284,790 | * 2/1994 | Karpinski | 437/129 |
| 5,325,386 | * 6/1994 | Jewell et al. | 372/50 |
| 5,449,970 | * 9/1995 | Kumar et al. | 313/495 |
| 5,534,950 | * 7/1996 | Hargis et al. | 348/758 |
| 5,574,304 | * 11/1996 | Mushiage et al. | 257/466 |
| 5,656,883 | * 8/1997 | Christensen | 313/310 |
| 5,909,296 | * 6/1999 | Tsacoyeanes | 359/152 |
| 5,912,997 | * 6/1999 | Bischel et al. | 385/15 |
| 5,952,680 | * 9/1999 | Strite | 257/88 |
| 5,977,718 | * 11/1999 | Christensen | 315/169.1 |
| 6,030,266 | * 2/2000 | Ida et al. | 445/24 |

* cited by examiner

*Primary Examiner*—Sherrie Hsia
(74) *Attorney, Agent, or Firm*—R. Neil Sudol; Henry D. Coleman; William J. Sapone

(57) ABSTRACT

A substantially flat television display comprises, in accordance with the present invention, a plurality of superluminescent or laser diodes which are mounted to a substrate or carrier for spacing in a planar array. A protective sheet covers the diodes and is connected to the substrate or carrier, while energization componentry is operatively connected to the diodes for energizing the diodes in accordance with an incoming video signal to reproduce an image embodied in the video signal. In a color television or video display, the superluminescent or laser diodes are tuned to different frequency ranges, so as to reproduce the image in color.

8 Claims, 1 Drawing Sheet

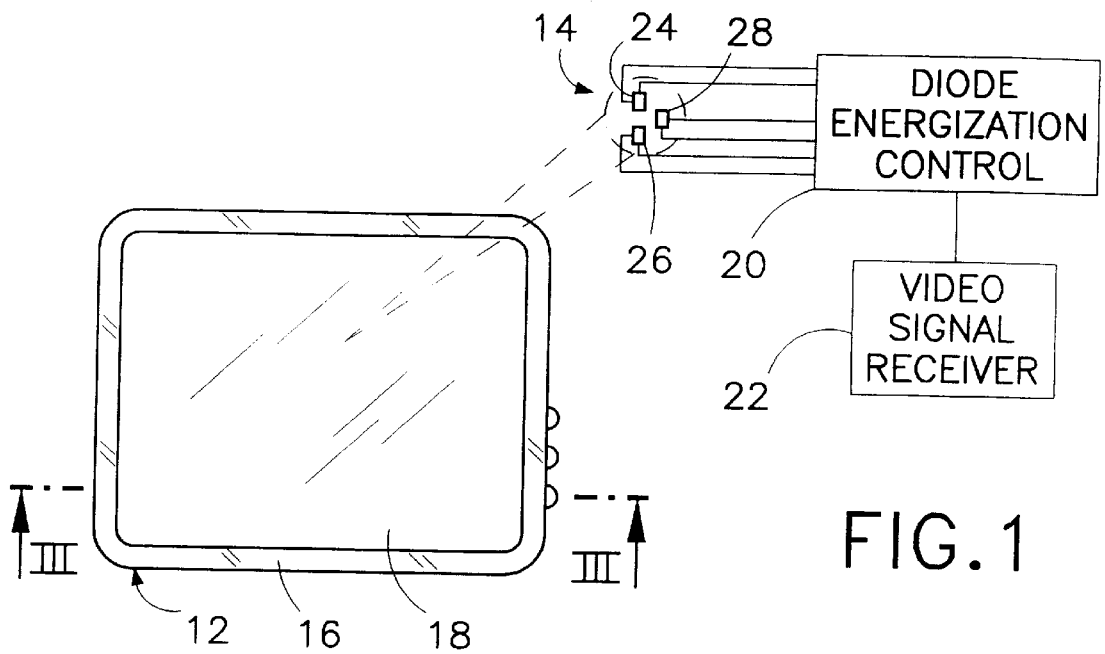
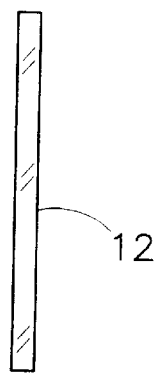
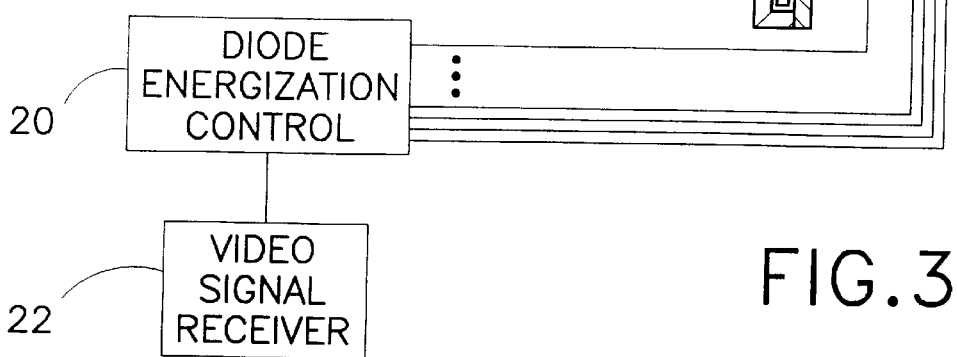

THIN VIDEO DISPLAY WITH SUPERLUMINESCENT OR LASER DIODES

BACKGROUND OF THE INVENTION

This invention relates to a video display or television monitor. More particularly, this invention relates to such a display which is relatively flat or thin.

Considerable effort has been taken over the past twenty years to develop flat televisions or video monitors. Such screens or monitors could hang on the wall, be stored in a desk top or transported in a briefcase.

Although laptop and notebook computers have appear on the market with flat screens, there is always some compromise with respect to clarity or contrast. In addition, no such screen has been capable of producing satisfactory color.

OBJECTS OF THE INVENTION

An object of the present invention is to provide a flat television or video display.

It is a related object of the present invention to provide a thin television or video display.

Another object of the present invention is to provide such a television or video display which is capable or producing color images suitable for projection or direct viewing.

Another, more particular, object of the present invention is to provide such a television or video display which is easy to manufacture.

These and other objects of the present invention will be apparent from the drawings and detailed descriptions herein.

SUMMARY OF THE INVENTION

A substantially flat television display comprises, in accordance with the present invention, a plurality of visible multi-wavelength laser or superluminescent diodes mounted in a two-dimensional array to a substantially flat substrate or carrier. The diodes are protected by a cover sheet or internal coating which is connected to the substrate or carrier. Energization componentry is operatively connected to the diodes for energizing the diodes in accordance with an incoming video signal to reproduce an image embodied in the video signal. In a color television or video display, the superluminescent or laser diodes are tuned to different frequency ranges or triades of fixed RGB superliuminescent values, so as to reproduce the image in color. The protective cover sheet may function also to disperse light emitted by the superluminescent or laser diodes, to generate a more continuous image.

A television or video display in accordance with the present invention is substantially flat and produces a sharp, clear image. In addition, color reproduction and brightness is satisfactory, if not excellent.

In accordance with a feature of the present invention, the substrate or carrier and the protective cover sheet are flexible to thereby provide a malleable video screen. Thus, such a video screen may be shaped to conform to any number of pre-existing support surfaces to which the video screen or display is mounted. For example, the video screen may be curved to assume a cylindrical shape in being placed on a column. Other support surfaces include car windshields and seat backs.

BRIEF DESCRIPTION OF THE DRAWING

FIG. 1 is partially a block diagram and partially a schematic front elevational view, on a reduced scale, of a flat video or television display in accordance with the present invention, showing superluminescent or laser diode components on an enlarged scale.

FIG. 2 is a schematic side elevational view of the flat television display of FIG. 1.

FIG. 3 is basically a partial, schematic cross-section view taken along line III—III in FIG. 1.

DESCRIPTION OF THE PREFERRED EMBODIMENTS

As illustrated in the drawing, a substantially flat television display 12 comprises a plurality of superluminescent or laser diodes 14 mounted in a planar array to a substrate or carrier 16 (e.g., a semiconductor substrate). Diodes 14 are protected by a cover sheet 18 which is connected to substrate or carrier 16. Cover sheet 18 may be made of a translucent type material for scattering, refracting or dispersing laser energy emitted by diodes 14, thereby maximizing the effective viewing angle and brightness.

Energization control componentry 20 is operatively connected to diodes 14 for energizing the diodes in accordance with an incoming video signal to reproduce an image embodied in the video signal. The video signal is captured by a receiver element 22 which may take the form of an antenna for receiving broadcast transmissions, a fiber optic or coaxial connector for receiving cable transmission or a connector for receiving video program material from a camera or a video playback unit.

Television or video display 12 may be a color display. In that case, diodes 14 include superluminescent or laser diodes 24, 26, and 28 tuned to different frequency ranges (e.g., in red, green and blue ranges), so as to reproduce a video image in color.

Substrate or carrier 16 and protective cover sheet 18 may be made of a flexible material to enable conformity of the screen with any number of nonplanar, as well as flat, support surfaces. Such a video screen or display is malleable for maximizing adaptability to different environments. Thus, the video screen may be shaped to conform to a cylindrical shape in being placed on a column.

Display 12 may be provided with a fly's eye or lenticular lens array (not shown) for generating a three-dimensional or stereoscopic display image when fed an appropriate dual video signal generated by a pair of spaced cameras. Lenticular lens video displays, as well as the operation thereof with input from two cameras, is disclosed in several U.S. patents, including U.S. Pat. No. 4,214,257 to Yamauchi and U.S. Pat. No. 4,164,748 to Nagata, the disclosures of which are hereby incorporated by reference.

Although the invention has been described in terms of particular embodiments and applications, one of ordinary skill in the art, in light of this teaching, can generate additional embodiments and modifications without departing from the spirit of or exceeding the scope of the claimed invention. Accordingly, it is to be understood that the drawings and descriptions herein are profferred by way of example to facilitate comprehension of the invention and should not be construed to limit the scope thereof.

What is claimed is:

1. A flat or thin television display comprising:
   a plurality of superluminescent or laser diodes;
   a thin substrate or carrier for holding said diodes in an array, said diodes being mounted to said substrate or carrier;
   a protective sheet over said diodes, said sheet being connected to said substrate or carrier; and energization means operatively connected to said diodes for energizing same in accordance with an incoming video signal to reproduce an image embodied in said video signal, said protective sheet being made of a translucent scattering material to generate said image on said protective sheet.

2. The display defined in claim 1 wherein said superluminescent or laser diodes are tuned to different frequency ranges, so as to reproduce said image in color.

3. The display defined in claim 1 wherein said substrate or carrier and said sheet are flexible, thereby permitting the array of diodes to be formed into different shapes.

4. The display defined in claim 1 wherein said sheet is positioned adjacent to said diodes.

5. A flat or thin television display comprising:

a plurality of superluminescent or laser diodes;

a thin substrate or carrier for holding said diodes in any of a plurality of differently shaped arrays, said diodes being mounted to said substrate or carrier;

a protective sheet over said diodes, said sheet being connected to said substrate or carrier; and energization means operatively connected to said diodes for energizing same in accordance with an incoming video signal to reproduce an image embodied in said video signal, said substrate or carrier and said sheet being flexible, thereby permitting the array of diodes to be formed into the differently shaped arrays.

6. The display defined in claim 5 wherein said superluminescent or laser diodes are tuned to different frequency ranges, so as to reproduce said image in color.

7. The display defined in claim 5 wherein said sheet is made of a translucent scattering material to generate said image on said protective sheet.

8. The display defined in claim 5 wherein said sheet is positioned adjacent to said diodes.

* * * * *